United States Patent
Huygen

[11] Patent Number: 5,771,924
[45] Date of Patent: Jun. 30, 1998

[54] VALVE

[75] Inventor: Jan Cornelis Huygen, Rotterdam, Netherlands

[73] Assignee: Flamco B.V., Gouda, Netherlands

[21] Appl. No.: 454,135

[22] PCT Filed: May 11, 1994

[86] PCT No.: PCT/NL94/00109

§ 371 Date: Feb. 20, 1996

§ 102(e) Date: Feb. 20, 1996

[87] PCT Pub. No.: WO94/27071

PCT Pub. Date: Nov. 24, 1994

[30] Foreign Application Priority Data

May 18, 1993 [NL] Netherlands ............................ 9300862

[51] Int. Cl.⁶ ...................................................... F16K 7/00
[52] U.S. Cl. ........................ 137/522; 251/253; 251/335.2
[58] Field of Search .................................. 137/522, 523; 251/253, 255, 335.2

[56] References Cited

U.S. PATENT DOCUMENTS 2,664,265 12/1953 Howser .................................... 251/132
4,103,704 8/1978 Richards .................................. 137/522

FOREIGN PATENT DOCUMENTS

A0504084 9/1992 European Pat. Off. .
U9006840 10/1990 Germany .
2203820 10/1988 United Kingdom .

*Primary Examiner*—Gerald A. Michalsky
*Attorney, Agent, or Firm*—Brooks & Kushman P.C.

[57] ABSTRACT

A safety valve having a valve body movable toward and from a valve seat with a spring bearing against a spring seat and pressing the valve body against the valve seat has a rotary knob on the housing having a portion engaging a boss on the valve body to slide the valve body away from the valve seat upon rotation of the knob.

8 Claims, 1 Drawing Sheet

VALVE

DE-GM 90 06 840 discloses a valve used in particular as a safety valve in heating and hot water systems. The spring force exerted by the pre-tensioned spring on the valve body ensures that the valve body is pressed against the valve seat in a sealing manner. However, if the pressure prevailing in the system exceeds a maximum value determined by the spring force of the spring, the valve body moves away from the valve seat, and the excess pressure in the system can escape automatically. In order to prevent water or vapour leaving the system from passing into the space of the valve in which the spring and the valve body are located, said space is separated from the passage by means of a flexible diaphragm. The diaphragm is fixed to the valve body and a circumferential portion of the diaphragm is fixed to the housing of the valve. In the case of safety valves it is essential to be able to check the operation of the valve by hand. For this purpose, the rotary knob is then operated, with the result that the valve body is moved briefly from the valve seat.

In the case of this known embodiment, the valve body is connected to the rotary knob by means of a connecting rod situated on the main axis of the valve. The rotary knob is provided with cam followers which can interact in such a way with guide elements immovably fixed to the housing of the valve that when the rotary knob is turned it moves a distance away from the housing, and in the course of said movement takes the valve body with it and lifts it off the valve seat.

This known valve has the disadvantage that when the valve body reaches the closed position again, the rotary knob moves towards the housing again, and there is a considerable risk of the operator having part of his hand or fingers caught to some extent between the rotary knob and the housing. Furthermore, when the rotary knob is being turned, a torque is exerted on the diaphragm, which can become damaged as a result. Also, it is a disadvantage that, due to its above-described design, the known safety valve can also be operated by pulling the turning knob. The chance of this occurring accidentally is considerably greater than if manual operation of the valve were possible only by turning the rotary knob. Finally this known valve is composed of an undesirable large number of parts.

The object of the invention is to eliminate the above-mentioned disadvantages and to provide a valve which can be operated without any problem, and which is composed of a small number of parts which are easy to produce and assemble.

This object is achieved by a valve of the type mentioned in the preamble, which is characterized in that the wall extending between the spring seat and the valve seat is provided with one or more slots which extend substantially in the direction of the main axis of the valve and guide the boss or bosses of the valve body protruding through the slots, and in that the rotary knob is provided with means which can engage under one or more bosses of the valve body, which means can interact with the boss or bosses of the valve body in such a way that when the rotary knob is turned, the valve body is moved away from the valve seat.

This ensures that on turning of the rotary knob the means disposed thereon move under the at least one projecting boss of the valve body, and on further turning of the rotary knob they force the valve body upwards. The rotary knob itself does not move in the direction of the main axis, away from the housing. When the valve body moves away from or towards the valve seat, the valve body is guided in the direction of the main axis of the valve as the boss or bosses provided on the valve body protrude through the slot(s). The sliding of the bosses of the valve body in the slots prevents a torque from being transmitted to the valve body when turning the rotary knob.

The valve body is preferably provided with a plurality of bosses, disposed at equal intervals in the peripheral direction, and the rotary knob has a wall situated outside the bosses and around the main axis of the valve, which wall is provided with a number of guide elements corresponding to at least the number of bosses of the valve body, the guide elements projecting inwards from the wall of the rotary knob, and in the peripheral direction having a distance between them which at least corresponds to the measurement of the bosses of the valve body. The rotary knob can be in the form of, for example, a ring lying around the wall provided with openings, or it can be a cap placed over said wall.

In a preferred embodiment, the valve body has a wall extending around the main axis, which wall is provided with a plurality of outward projecting bosses near the end facing away from the valve seat, the wall of the valve body being guided in a wall of an element surrounding it, which element bears the spring seat near its end facing away from the valve seat, while the wall of said element is provided with slots extending parallel to the main axis of the valve, for passing the bosses of the valve body through them, and the element is provided with means for fixing the element to the housing.

In a specific embodiment of the valve according to the invention, the spring seat is integral with the element guiding the valve body.

The rotary knob is advantageously provided with means for fixing the rotary knob in a freely rotatable manner to the housing. If the rotary knob is made of, for example, plastic and is provided-with resilient lips which can engage on the housing of the valve when the valve is being assembled, it is ensured in a very simple way that the valve cannot be operated by pulling the rotary knob.

In another embodiment, the rotary knob comprises an end face, and the spring seat is located at a position adjoining the end face of the rotary knob. Such an embodiment is particularly advantageous because in this way the length of the spring is as great as possible in relation to the total length of the valve between the valve seat and the end face of the rotary knob. In the case of safety valves, the accuracy of the spring force of the pre-tensioned spring is a problem, due to tolerances in the measurements of the parts used. If the space available for the spring is of greater length, the influence of the tolerances of the parts of the valve between which the spring is accommodated is less in relative terms, so that in this way greater accuracy of the valve can be achieved.

In another preferred embodiment the valve comprises a flexible diaphragm fixed to the housing and the valve body. This prevents outflowing water or vapour from passing into the space of the valve in which the spring and the valve body are located.

The invention will be explained in greater detail below with reference to the drawing of an example of an embodiment of the valve according to the invention, in which.

Figure 1:
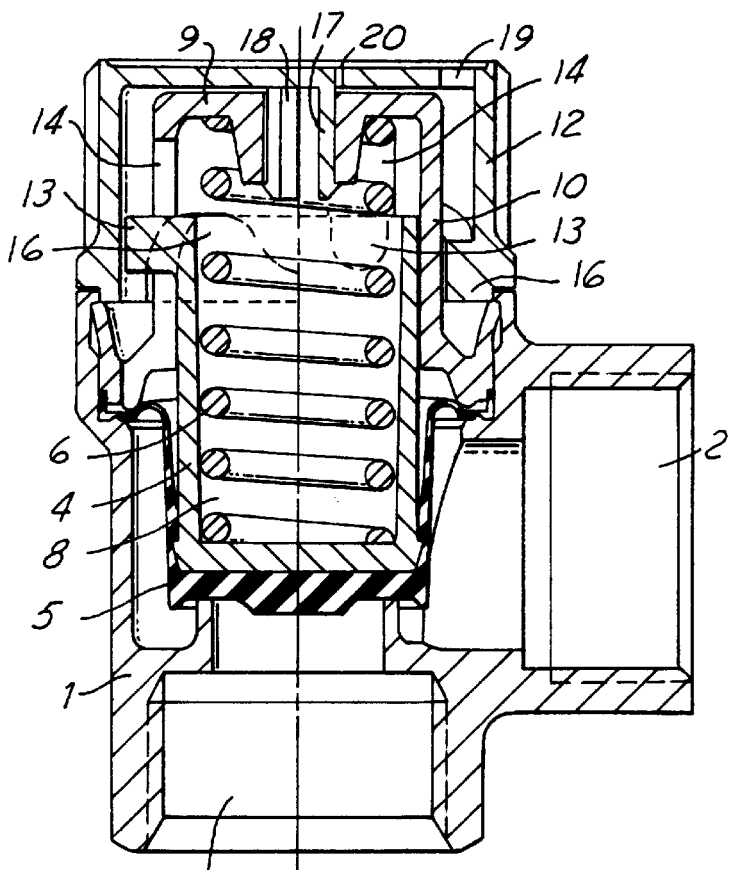
FIG. 1 shows a longitudinal section of an example of an embodiment of the valve according to the invention.
Figure 2:
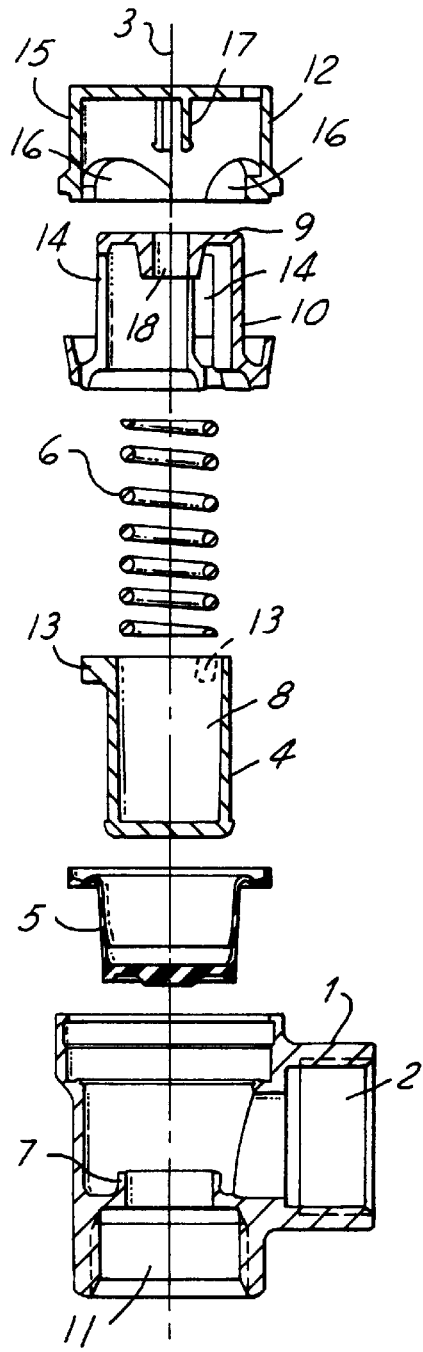
FIG. 2 shows a view, with disassembled parts, in section of the valve in FIG. 1.

The safety valve shown in FIGS. 1 and 2 comprises a metal housing 1 with a passage 2. A valve body 4, guided so that it slides in the direction of a main axis 3 of the valve, is provided for closing the passage 2. A flexible diaphragm 5 ensures that the passage 2 and the remaining part of the valve are separated. The valve body 4 is pressed against a valve seat 7 lying around the passage 2 by means of a spring 6 which is compressed at a specific predetermined spring force. The flexible diaphragm 5 ensures that the valve body 4 lies against the valve seat 7 in a sealing manner. The valve body 4 has a cavity 8 which is open towards its side facing away from the valve seat 7, in which cavity 8 the spring 6 is placed. The spring 6 rests with its end facing away from the valve seat 7 against a part of a plastic element 10 forming a spring seat 9. If the pressure at the inlet side 11 of the passage 2 of the valve exceeds a maximum value determined by the predetermined spring force of the spring 6, the valve body 4 moves away from the valve seat 7, and the excess pressure can escape.

A rotary knob 12 is provided in order to check the operation of the safety valve. If the rotary knob is turned by hand, the valve body 4 is lifted off the valve seat 7. For this purpose, the cylindrical valve body 4 is provided with three outward projecting cam followers 13, lying at equal intervals around the periphery. The cam followers 13 each protrude through a corresponding slot 14 provided in a wall of the element 10. This wall connects the spring seat 9 to the housing wherein the valve seat 7 is provided. The slots 14 extend to the underside of the element 10, so that after the valve body 4 has been placed in the housing 1 the element 10 is simple to place over it. The bottom edge of the element 10 is in the form of a resilient rim, which engages in a press fit in a groove in the housing 1 and at the same time clamps a circumferential portion of the diaphragm 5 in a manner forming a seal in the housing. The slots 14 form a guide in the direction of the main axis 3 of the valve for the cam followers 13. The slots 14 also ensure that during the operation of the rotary knob no torque can be transmitted to the valve body 4 and to the flexible diaphragm 5 lying around it. The rotary knob 12 has a wall 15 which lies around the main axis 3 and outside the cam followers 13, and which is provided with three inward projecting cams 16. Such a distance is present between the individual cams 16 that the rotary knob 12 is easy to place from above over the element 10 already fitted on the housing 1. The rotary knob 12 is provided with three resilient lips 17 which engage in a central opening 18 of the element 10. This means that the rotary knob 12 is fixed in a freely rotatable manner, and the rotary knob 12 cannot be removed again after fitting. The cams 16 are identical and have such a profile that when the rotary knob 12 is turned anticlockwise from the position shown in FIG. 1, they can engage under the cam followers 13. On further turning of the rotary knob 12, the cam followers 13 then slide over cams 16, with the result that the valve body 4 is lifted off the valve seat 7 against the action of the spring 6. The cam followers 13 then slide downwards along the cams 16, and the passage 2 is closed again. The cams 16 shown are of such a shape that it still is possible to turn the rotary knob 12 clockwise, but only through the application of a great initial force. This ensures that damage to the rotary knob mechanism through turning the rotary knob clockwise despite the great resistance is avoided.

Due to the fact that in the embodiment shown the spring seat 9 is located adjacent to the end face of the rotary knob 12, the length of the spring 6 in relation to the length between the valve seat 7 and the end face of the rotary knob 12 is as great as possible. This is an advantage, since in practice there are requirements relating to the pressure at which the safety valve opens. As mentioned earlier, this pressure is determined by the predetermined spring force of the pre-tensioned spring 6. Tolerances during the manufacture of the parts of the valve between which the spring 6 is accommodated can cause this predetermined spring force to vary to an undesirable degree. The influence of the manufacturing tolerances is, however, less as the length of the spring increases. In the case of the valve according to the invention, the length of the spring can be greater than that of a known valve, where the distance between the valve seat and the end face of the valve is the same. This is achieved through the fact that the rotary knob mechanism lies around the spring 6, and not entirely or partially in line therewith.

In another embodiment, which is not shown, the spring seat is formed by a disc which is made adjustable in the direction of the main axis, and which is fixed to the wall surrounding it by means of, for example, screw thread or in a press fit. This embodiment makes it possible to adjust the predetermined pressure of the spring 6. The wall surrounding the spring seat can in this case be formed either by a plastic element of the type shown in FIG. 1, or by an extended part of the metal housing.

Figure 3:
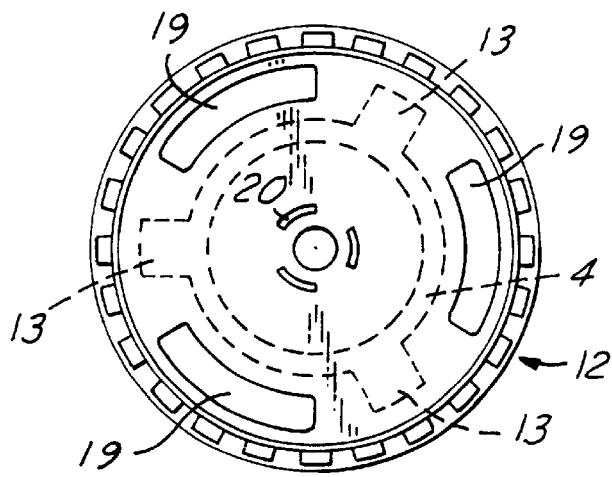
FIG. 3 shows a partial top view of the valve in FIG. 1.

FIG. 3 shows the end face of the rotary knob 12 with openings 19 and 20 through which mould parts for forming the cams 16 and the resilient lips 17 respectively project during the injection moulding of the rotary knob.

I claim:
1. A safety valve comprising, in combination:
a housing having a passage therethrough;
a valve seat in the housing around the passageway;
a valve body in the housing guided therein for sidable movement toward and from the valve seat to open and close the passageway;
said valve body having a cavity therein opening outwardly through the valve body at that side opposite the valve seat;
a spring seat in the housing at that side of the valve body opposite from the valve seat;
a spring in said cavity bearing against said spring seat for pressing the valve body against the valve seat;
a wall extending between and connecting the spring seat and valve seat and having a slot extending in the direction of said valve body movement;
said valve body having a boss extending into said slot to prevent rotation of the valve body;
a rotary knob on the housing having a portion engaging said boss to slide the valve body away from the valve seat upon rotation of the knob; and
a flexible diaphragm fixed to the housing and the valve body.
2. The invention defined by claim 1 wherein said wall encircles said valve body and there are a plurality of said slots in said wall spaced equidistantly therearound, and said valve body has a boss extending into each slot and said knob has a portion for engaging each boss to slide the valve body away from the valve seat upon rotation of the knob.
3. A safety valve comprising, in combination:
a housing with a passage;
a valve body for closing the passage, which valve body is guided so that it slides in the housing in the direction of a main axis of the valve;
a spring for pressing the valve body against a valve seat situated around the passage;
a rotary knob rotatable about the main axis for moving the valve body away from the valve seat;
said valve body having a cavity open at its side facing away from the valve seat in which cavity said spring is disposed;

said spring resting with an end facing away from the valve seat against a spring seat connected by a wall to the valve seat;

said valve body provided with at least one outwardly projecting boss and said wall extending between the spring seat and the valve seat being provided with at least one slot extending substantially in the direction of the main axis of the valve and said boss extending into the at least one slot; and said rotary knob provided with means for engaging said boss to slide the valve body away from the valve seat upon rotation of the knob.

4. Valve according to claim 3, characterized in that the valve body (4) is provided with a plurality of bosses, disposed at equal intervals in the peripheral direction, and in that the rotary knob has a wall situated outside the bosses and around the main axis of the valve, which wall is provided with a number of guide elements corresponding to at least the number of bosses of the valve body, the guide elements projecting inwards from the wall of the rotary knob, and in the peripheral direction having a distance between them which at least corresponds to the location of the bosses of the valve body.

5. Valve according to claim 4, characterized in that the valve body has a wall extending around the main axis, which wall is provided with a plurality of outward projecting bosses near the end facing away from the valve seat, the wall of the valve body being guided in a wall of an element surrounding it, which element bears the spring seat near its end facing away from the valve seat, while the wall of said element is provided with slots extending parallel to the main axis of the valve, for passing the bosses of the valve body through them, and the element is provided with means for fixing the element to the housing.

6. Valve according to claim 5, characterized in that the spring seat (9) is integral with the element (10) guiding the valve body (4).

7. Valve according to claim 3, characterized in that the rotary knob (12) is provided with means (17) for fixing the rotary knob in a freely rotatable manner to the housing.

8. Valve according to claim 3, characterized in that the rotary knob (12) comprises an end face, and the spring seat (9) is located at a position adjoining the end face of the rotary knob.

\* \* \* \* \*